June 19, 1962 H. P. LAVIN 3,040,127
OPTICAL SYSTEM
Filed Aug. 3, 1959 2 Sheets-Sheet 1
FIG.1
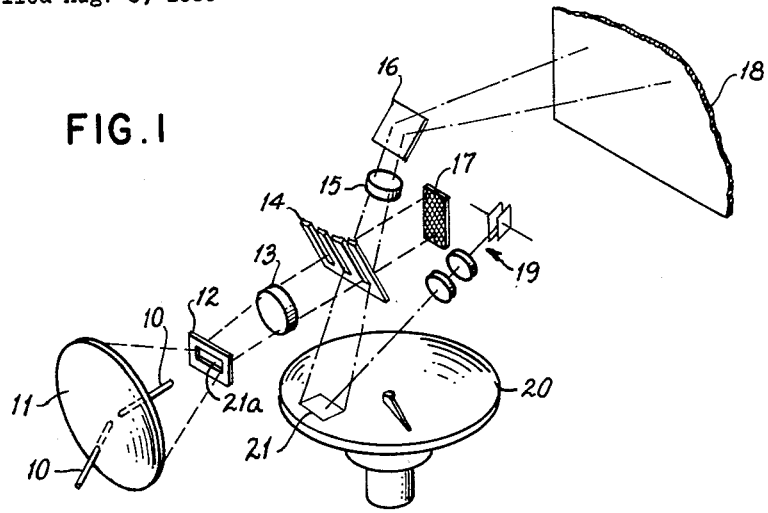
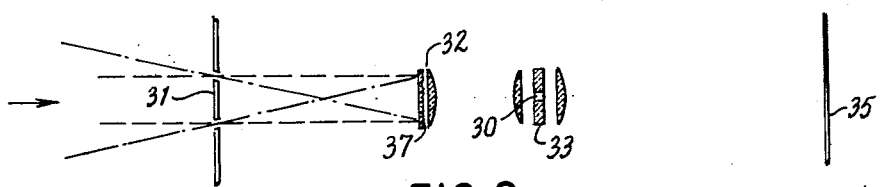
FIG.2
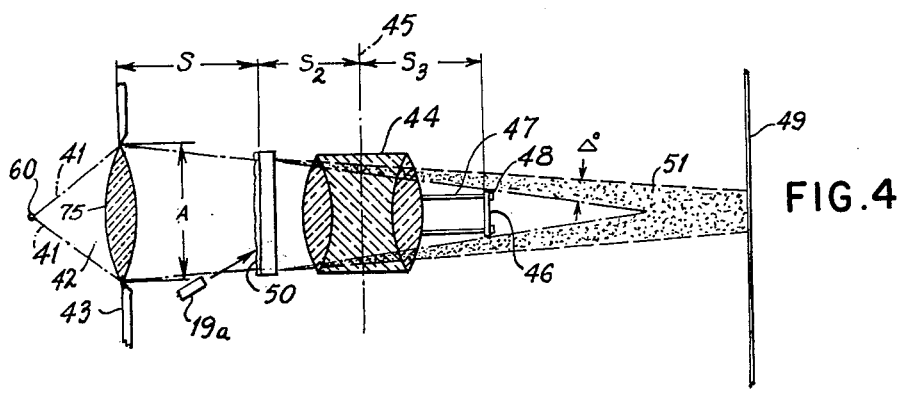
FIG.4
FIG.5
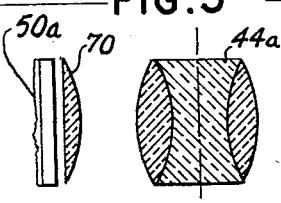
Herbert P. Lavin
INVENTOR.
BY Joseph P. Kates
HIS ATTORNEY

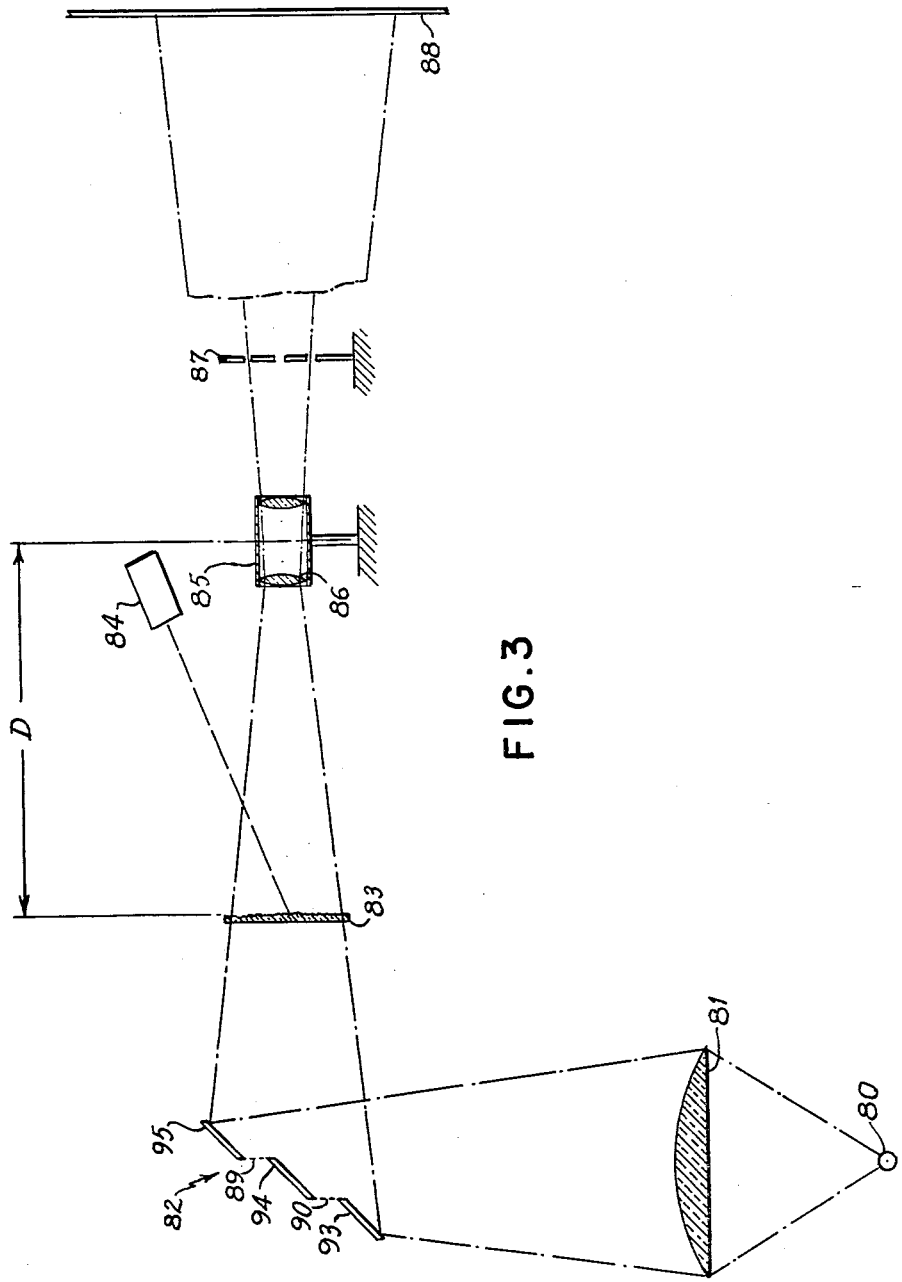

3,040,127
OPTICAL SYSTEM

Herbert P. Lavin, Baldwinsville, N.Y., assignor to General Electric Company, a corporation of New York
Filed Aug. 3, 1959, Ser. No. 831,152
11 Claims. (Cl. 178—7.5)

The present invention relates to an optical system and more particularly relates to an optical system to control light flux in accordance with a modulating signal.

In accordance with the invention a transparent media capable of being deformed is disposed so that an image of the media may be formed by a projection lens on a desired surface, for example, a display screen. Light flux from a high intensity source of light illuminates the media. When the transparent media is in its undisturbed state, an image of the light source will be formed between the projection lens and the display screen. A mask of size and shape similar (or in proportion) to the light source interposed at this image point can block the light flux so that it will not reach the display screen in undisturbed state of the transparent media. If the transparent media is deformed, light is refracted and diffracted so as to pass beyond the mask and contributes to the display screen illumination. The amount of light flux passing around the restricting mask is proportional to the amount of deformation of the control media. The modulation process (used for control of deformation of the media) should be capable of very fast operation of the order of ten to the minus seventh seconds ($10^{-7}$ seconds) and should be capable of controlling the light flux over a wide range. The light rays are caused to converge toward the projection lens and partially therethrough and then diverge toward the mask thus permitting a smaller and slower projection lens.

Prior art devices wherein a deformable medium controls a light stream include the apparatus of Patent No. 2,605,352 issued July 29, 1952, to E. F. Fischer for Deformable Medium for Controlling a Light Stream and the similar system of Patent 2,391,451 issued December 25, 1945, to F. E. Fischer for Process and Appliance for Projecting Television Pictures. Such systems are described in Journal of the Society of Motion Picture and Television Engineers, April 1953, Part I, in Eidophor System of Theater Television, Earl I. Sponable, pp. 337–343 and The Fisher Large-Screen Projection Systems, E. Baumann, pp. 344–356.

Prior art devices using Schlieren mirrors have disadvantages in that the Schlieren mirror incorporated must have a precision surface requiring careful manufacturing standards found difficult or impossible to maintain. Where in prior art systems a Schlieren lens is incorporated its disadvantages are that it must be corrected for monochromatic as well as chromatic aberrations; the corrected Schlieren lens consists of several elements each of which contribute transmission and reflection losses (the total loss being of the order of 10 to 30 percent). The mask or bars in such prior art systems must be positioned at the principal plane of the projection lens if the mask is not to function in part as a field stop as well as a mask and longitudinal misadjustment of the mask causes nonuniform shading of projected pictures. In addition, requirement for location of the mask at the principal plane makes the mask inaccessible for adjustment. Another disadvantage of prior art devices is that the size and location of the aperture and the power of the Schlieren lens are subject to change with different focal lengths of respective projection lenses because of changes in location of the principal plane of the projection lenses. In some cases each lens must be specially designated to have the same principal plane or to have a short focal length and a larger aperture.

Copending patent application, Serial No. 795,694 of William E. Glenn, Jr., for "Optical System" and assigned to the assignee of the present invention shows the concept of a projection lens which also performs the function of a Schlieren lens. In the invention of that patent application the bar mask is mounted at a distance from the projection lens equal to its focal length because of the means to insure parallel light between the control media and the projection lens. The entrance pupil of the projection lens is made equal to the diagonal length of the control media raster which may require a very fast projection lens. The word fast is used in a sense analogous to the photography art connotating requirement for a large lens and adaptable for use with less exposure time. For example, in accordance with the preferred embodiment illustrated in the Dr. Glenn application, if a projection lens of 4.5 inches were used for required screen size and the raster had a 3 inch diagonal, an $$f/ = \frac{4.5}{3}$$

or an $f1.5$ projection lens would be used. The invention of this application provides improvement over the Dr. Glenn system in many applications by requiring a less costly, slower lens with fewer elements to in some instances improve conditions of flare, to improve contrast and the present invention provides substantially greater depth of focus (depth of field would involve object distance and depth of focus involves image distance).

The present invention overcomes these and other deficiencies of the prior art and provides an improvement in the means and method wherein the projection lens performs two functions, that of imaging the projected picture upon the display screen and that of producing an image of the aperture on the mask, and wherein the mask may be located external to the projection lens (not at the principal plane) to permit adjustment of mask alignment and location. The structure of the present invention provides rays converging toward the projection lens and because of this the depth of focus is increased, better contrast results and flare is avoided.

Accordingly, an object of the present invention is to provide an optical system to control light flux in accordance with a very-fast operating, modulation process which process is capable of controlling light flux over a wide range and wherein the system provides required adjustment for a good quality picture and which system comprises a minimum of complex and expensive elements.

Another purpose of the present invention is to provide an optical system to control light flux in accordance with a modulating signal wherein a transparent media capable of being deformed may apply an image projected thereon on a display screen wherein the structure in which the system is used may vary widely in size and which system will incorporate a minimum of complex lens mechanisms.

Another aim of the present invention is to provide an improved optical system and method wherein a deformable medium is illuminated and scanned with a modulating signal to provide display screen illumination over a wide range of screen locations and wherein the amount of light flux passing from the medium to the source around a positionally adjustable light blocking or restricting mask is proportional to deformation of the control media.

Another object of the present invention is to provide improved apparatus for imaging a projected television picture upon a display screen which apparatus will incorporate a projection lens of simple, inexpensive and relatively small configuration and a mask external to the principal plane of the projection lens.

Another purpose of the present invention is to provide a means and a method for projecting television pictures upon a large screen which will be adaptable for high intensity color television and wherein high intensity light and a modulating signal are impinged upon a deformable control media in an optical system further comprising an illumination or converging means, a projection lens and a mask spaced therefrom a predetermined distance without additional Schlieren lenses so that the system will project an accurate reproduction of a video signal upon a large screen for display purposes.

Another aim of the present invention is to provide means for high intensity color television projection upon a large screen which means incorporates a minimum of lens structures of the most economical and most simple design possible and which means eliminates necessity for a strong Schlieren lens the inventive means incorporating a mask which may be readily adjusted for optimum picture presentation.

Another object of the present invention is to provide a large screen projection system which system will omit requirements for precision surface Schlieren mirrors and for complex projection lenses, wherein longitudinal adjustment of position of an incorporated mask may be conveniently made and wherein size and location of an incorporated aperture and the power of Schlieren lenses will not be affected with different focal length of projection lenses.

Another aim of the present invention is to provide apparatus for imaging upon a display screen which apparatus incorporates a source of light, a deformable medium through which the light passes, a projection lens and a mask and means to converge the light rays from the deformable medium toward the projection lens to thereby permit a relatively slow projection lens with less entrance pupil diameter to be utilized.

Another object of the present invention is to provide apparatus for imaging a raster impinged upon a deformable medium wherein light rays from the medium converge toward a projection lens such that the illumination cone apex is within the projection lens entrance pupil and the light rays then diverge toward a mask, the rays being diffracted around the mask to a screen when the deformable medium is impinged upon by charges of electromagnetic energy such that a slower and cheaper lens may be provided than in prior art systems and conditions of flare and contrast is improved and the depth of field is made substantially greater.

While the novel and distinctive features of the invention are particularly pointed out in the appended claims, a more expository treatment of the invention, in principle and in detail, together with additional objects and advantages thereof is afforded by the following description and accompanying drawing in which:

FIG. 1 is a schematic representation of a large screen television display system utilizing a spherical mirror to illustrate difficulties which the present invention overcomes, FIG. 2 is a schematic representation of another large screen television display system utilizing lenses to illustrate the difficulties which the present invention overcomes, FIG. 3 is a schematic representation of a first preferred illustrative embodiment of the present invention, FIG. 4 is a schematic representation of another illustrative embodiment of the apparatus of the present invention, and FIG. 5 is a schematic representation comprising modified members which could be utilized in the illustrative embodiment of FIG. 4.

A desirable system to produce a theater-sized picture of adequate brightness is that wherein a high intensity arc may be employed as a light source. By making use of optical principles of Foucault which were later extended by Toepler, who observed the difference in refractive index in air caused by heat waves in the optical system, controlling of the light beam may be effected by a Toepler Schlieren or more popularly known as Schlieren system. The word Schlieren means streaks or striae.

In such a system if an arc lamp or other high intensity light source is disposed in front of a condenser lens to produce uniform illumination of a plane placed therebefore and a light modulating or controlling medium is placed in the same plane between two bar and slit systems, also termed mask systems, disposed on opposite sides of the plane and a field lens is arranged such that it impinges the slits of the first system upon the bars of the other system at the same time insuring correct illumination of each and every point on the controlling medium and the control medium is deformed in a suitable manner, diffraction of the incident light can be effected and the diffracted portions of the beams may be made to pass through the slits of the second bar and slit system and reach a projection screen as image forming light. An oil layer of minute thickness at the image plane may take the place of the usual motion picture film in the film gate as far as optical considerations are concerned and may be suitably supported as, for example, by a glass plate. If the incident illumination of every image point is blanked off by the strips of the second bar system and every point of the oil layer is illuminated (the oil layer being of uniform thickness and homogeneous under this condition) no light will reach the screen. However, if an electron beam from an electron gun scans the oil layer and forms thereon a picture raster, the electron gun will deposit electric charges point by point corresponding to the picture scanned on the oil layer and these charges will cause minute corrugations in the surface of the oil layer. Where corrugated, the light ray issuing from any such image point is diffracted and part of the light which normally illuminates the bars of the stop then passes through the slits and produces illumination on the projection screen. The illumination becomes more intense in proportion to the distortion of the liquid surface which gives a means of reproducing point by point and line by line a television picture raster on a full size screen. Deformation of the oil layer commences at the moment at which the cathode beam scans a particular point of the image. By a suitable choice of the conductivity and viscosity of the oil, it is possible to conserve the deformation for a considerable part of the image-scanning period so that it disappears shortly before the occurrence of succeeding scanning. Thus, illumination of a projection screen is maintained for this portion of the scanning period which represents a substantial light storage effect. The light storage effect is of primary importance in efficiency of such a method. Such efficiency is considerably in excess to that which can be achieved by using afterglow of a phosphor layer in ordinary cathode ray tubes. As has been indicated the invention relates to a system which makes use of a light source for the production of a screen picture. Brightness, therefore, as in motion picture projection depends largely upon the power of the source. Therefore, the present invention is devoted to a system which must be efficient enough to enable production of powerful light fluxes which can be utilized for the screens of even the largest theaters. The optical layout of the system should be readily adaptable to architectural necessities of the theaters and to be placed in existing booths. In television it is necessary to produce an enormous light flux in order to meet these requirements. The basis of the projection system which the invention supersedes is the type of light valve wherein an important element is the so-called Schlieren-Optical system. In such a Schlieren system the image of a system of bars and slits lying in a first plane and illuminated from one side is projected by the optical system on to an analogous system of bars and slits lying in a second plane. The images of the slits of the first system fall on the bars of the second system and the images of the bars of the first system fall on the slits of the second system. Under such circumstances, no light passes into the space beyond the second bar and slit system. Another lens may be disposed immediately behind the second plane, this lens having a focal length chosen so as to project the image of a plane near the Schlieren lens onto the screen. A medium may be inserted also such as a thin layer of oil film suitably supported as on a glass plate. Then, under the influence of electrostatic forces the surface of the oil may be deformed and in this way required raster elements may be formed. The charge may be applied to the deformable medium point by point by means of a cathode ray beam.

By deformation of such an oil film a picture may be obtained which picture can be projected upon a screen. In such apparatus the picture information should be stored for the duration of one picture for ideal reproduction. To do this the oil should be of such character that deformation remains for the duration of one picture period and decays as quickly as possible after the period is over. The electrical charges must also decay, of course. By utilizing a conductive oil the deposited charges will decay in time in accordance with an exponential function wherein electric conductivity governs the time constant. A problem presented by such systems is that the image constantly carries a certain average negative charge which exerts a constant average mechanical pressure on the oil surface. To prevent the oil film from being pushed out of the image field by this the oil carrier may be rotated so that the portion of the oil film in the image field is constantly renewed and if rotation is slow, influence on the image will be small.

Maximum amplitude of deformation of such oils is of the order of thousandths of a millimeter and hence the oil surface must be free from deficiencies which would lead to undesirable brightening up of the screen. This problem may be solved as follows:

If the relationship between the dimension of the raster elements and other dimensions of the optical system is appropriately chosen, deflection of the light may be accompanied by diffraction which permits for successful use of a system of lower imaging quality. Therefore, if the second bar system is made somewhat wider than the optical image of the slits of the first system the result will be to eliminate the brightening up effect of certain deformations.

Now, referring to the drawings and in particular to FIG. 1, light pencils 10 are disposed at right angles to spherical mirror 11. Disposed in the path of light from light pencils 10 and reflected from mirror 11 is an optical plate 12 having an aperture 21a which aperture may be centrally disposed. Disposed in axial alignment with the mirror 11 and the optical plate 12 is a condenser lens system 13. A bar system 14 consisting of mirrored strips is disposed optically behind the condenser lens system 13. A second spherical mirror 20 is provided with a concave surface and the mirror is disposed in angular relationship to the bar system 14 such that light rays from the bar system 14 will impinge upon the concave surface of spherical mirror 20. The light from the bar system 14 strikes a portion of the spherical mirror 20 which portion is shown as raster 21. It should be understood that the spherical mirror may be rotated slowly so that different portions of the oil will constitute the raster 21. Disposed in alignment with the system of mirror bars or mirror strips 14 is an absorbing mask or heat sink 17. The bar system 14 is disposed in angular relationship to the axis of the system comprising the mirror 11, the apertured plate 12 and the condenser lens system 13 such that light will be reflected to the raster 21 of spherical mirror 20 and be rereflected to the bar system 14. In the presence of modulation causing physical deformation of the oil in the raster the rereflected light passes through the slits formed by bar system 14. The light will then impinge on a projection lens 15 disposed opposite the mirror 20 and opposite the side of bar system 14 on which the spherical mirror 20 is disposed. A mirror 16 is in angular relationship to projection lens 15 such that when light rays impinge upon the mirror 16, the light rays are reflected to a screen 18. Screen 18 is disposed in spaced relationship to the mirror 16 and may be aligned axially thereto.

In operation the system performs as follows: The mirror strips in the bar system 14 are illuminated by means of arc lamp (light pencils) 10 by the light rays reflected off of mirror 11, through aperture 21a in apertured plate 12 through the condenser lens 13. When the light is reflected from the mirrored surface of the multiple Schlieren bar system 14 into the liquid raster 21 on the spherical mirror 20, pherical mirror 20 reflects the image back into the bars 14 with a 1 to 1 magnification in the absence of a disturbed liquid. When the liquid 21 is undulated by required video information from electron gun 19 the light that is reflected from the spherical mirror 20 is deviated by the oil which is deformed thereby and the light then passes through the slits of the bar system 14, through the projection lens 15 and then to mirror 16 and from mirror 16 the light is reflected to form an image on the display screen 18. In this manner when video information is fed from electron gun 19 by scanning the oil 21, a picture is formed on the display screen in accordance therewith. In such a system, the edges of the mirrored strip of bar system 14 may be blackened to be nonreflecting.

In this system electron gun velocity modulation of the cathode ray may be effected in place of amplitude modulation. To produce the picture raster a periodic distribution may be made of the charge along every line of the picture, the magnitude of the charge being proportional to the brightness of every picture point. As long as the cathode ray travels along a single picture line with constant velocity it will deposit a constant charge on each unit of length of the surface of the oil, the density of the charge being proportional to the writing speed for constant intensity of the cathode ray beam. The density of the charge can be influenced by varying writing speeds. With greater writing speed a smaller charge will be deposited on the oil and with smaller velocity of writing the charge is greater. If an alternating (A.C.) voltage of constant frequency is superimposed on the line, sweep voltage modulation may be produced, the frequency of this voltage determines the dimensions of raster elements and the amplitude controls the density of the charge deposited. Extreme care should be given to accurate focusing of the beam since the size and shape of the cathode ray spot should remain unchanged over the whole picture area. Widening of the spot darkens the picture (although it does not affect the definition). To obtain constant rectangular shape of the spot a mechanical tungsten diaphragm (not shown) may be placed in the cathode ray optical system at the crossover of the electron beam in front of the cathode. A special cathode might also be employed which will be of configuration such as to provide a constant beam current. One of the problems in production of such images is the effect of the very sensitive nature of the system whenever there are very small optical inhomogeneities. Such nonuniformity produces defects of the screen picture. Such things as dust which may be deposited on the optically sensitive parts will hurt the picture. Because of this a critical point in the system of FIG. 1 is the spherical mirror wherein the polish of the glass surface must be of an extremely excellent quality and the metallizing must be done so carefully that the process is not as commercially feasible as would be desirable. The present invention improves or overcomes this shortcoming as one of its features as will be explained hereinbelow in the description of FIGS. 3 and 4.

Referring to FIG. 2 an improved means and method of accomplishing the function of the device of FIG. 1 is shown. In the arrangement of FIG. 2 the multiple bar arrangement of bar system 14 is replaced with a single aperture 30 and a mask 31. In this system when the liquid is in an undisturbed state the mask 31 is imaged by the Schlieren lens 32 which is the optical counterpart of the spherical mirror 20 of the device of FIG. 1. If Schlieren lens 32 is not to degrade the picture which is projected on screen 35, it should either be located on the lamp side of the raster 37 or at the raster itself. As shown in FIG. 2 it is as near as possible to the raster. In the presence of modulation, light is diffracted by the raster 27 and passes through Schleiren lens system 32 into the projection lens 33 thus producing required light valve operation and projection of an image on screen 35 in accordance with the modulation effected.

As indicated hereinabove the Schlieren mirror of FIG. 1 requires a precision surface which cannot be easily manufactured carefully enough to meet required tolerances. Only a small portion of spherical mirror 20 is utilized at any time in order to increase the $f$ number and minimize aberrations. In the case of the Schlieren lens of FIG. 2 it must produce a quality image of the aperture on the mask, hence this lens must be corrected for monochromatic as well as chromatic aberrations. The corrected Schlieren lens must consist of several elements, each contributing transmission and reflection losses. Such losses even in a well designed and constructed Schlieren lens are of the order of 10 to 25 percent. In addition, the mask or bars of the systems of FIGS. 1 and 2 should be positioned at the principal plane of the projection lens 15 or 33 respectively if the mask is not to function undesirably in part as a field stop. Longitudinal misadjustment of the mask results in non-uniform shading of the projected picture in these apparatuses. This principal plane location of the mask is inaccessible for adjustment purposes. In the devices of FIGS. 1 and 2 the size and location of the aperture and the power of the Schlieren lens are all subject to change with different focal length of the projection lens because of changes in principal plane of the projection lens. Each projection lens must therefore be specially designed to have the same principal plane.

Referring to FIG. 3 a light source 80 may project light through a light ray converging means such as converging condenser lens 81. The light rays from light source 80 may be converged by converging condenser lens 81 to a system of mirrored bars 82 in angular planar relation to but in axial alignment with light source 80 and converging condenser lens 81. The system of mirrored bars (which may be defined also as the first mask system) may be generally referred to by the numeral 82 and may comprise a plurality of bars 93, 94 and 95, for example, which bars may be staggered so as to appear as a continuous mirror as seen by the light source 80. That is, bars 93, 94 and 95 may each be disposed in a separate plane parallel to the plane of one another and in angular relationship to the axis of the converging condenser lens 81 and of the projection lens 85 (to be described). From the system of bars 82 the light rays are caused to converge toward a control media 83 the surface of which may be scanned by an electron gun 84. The light rays may continue to converge toward projection lens 85 such that the apex of the illumination cone formed by the rays may fall in the projection lens entrance pupil as shown at 86 and from the illumination cone the light rays may diverge toward a second mask system 87. Mask system 87 may comprise a plurality of alternative mirrored bars and slits. Mirrored bars 93, 94 and 95 which are staggered to appear as a continuous mirror surface as viewed from the direction thereto of light source 80 are spatially separated from one another and so appear along their projection on a plane normal to the axis of the projection lens 85; that is, as a series of spaced apart mirrors is seen as viewed from the entrance pupil (not numbered) of projection lens 85. Spacing of the staggered mirror bars 93, 94 and 95 is shown by the dashed or interrupted lines 89 and 90. Restating, projection of the staggered bars 93, 94 and 95 of staggered bar system 82 on the control media 83 surface when undeformed would therefore be a discontinuous series of straight lines and the projection of these bars on a plane transverse to the axis of lens 81 would be a continuous straight line without overlap.

The light rays upon deformation of control media 83 by scanning from electron gun 84 may be refracted and diffracted around the individual bars (not numbered) of mask 87 such that light rays will reach the screen 88 to form an image thereon. In a system using parallel light ray projection to and from the deformable medium magnification of the first system bars and slits is proportional with respect to the second system mask bars and slits. As the projection lens is focused by adjusting upon the screen, at a distance that may be variable with each installation, the magnification of the bar and slit image will remain proportional or constant and optimum independently of the adjustment in such a system. In such a configuration the entrance pupil of the projection lens should be equal to the diagonal of the control media raster which may require a very fast projection lens. In the example as hereinbefore set forth where a projection lens of 4.5 inches is used for the required screen size and a 3 inch diagonal raster is provided, there should be an $$f/=\frac{4.5}{3}$$

or an $f1.5$ projection lens. Increased speed and size makes such a lens more expensive and elimination of the many optical elements required for correction of such a lens permits the system of this invention to have greater freedom from flare, better contrast and much greater depth of focus. Referring also to FIG. 4 in the system of the present invention which, as stated, utilizes converging light, in the undisturbed state of the control media all of the light passing through the entrance aperture 42 should be constrained by mask 46. When the control media is undulated, or deformed, the light flux hereinbefore constrained by the mask 46 is deviated off the mask in proportion to the amplitude of the control media deformation and thence the light flux continues unobstructed to the screen.

The cone of light between the control media and the projection lens may assume three configurations (1) diverging, (2) parallel, and (3) converging. In the diverging case, a very fast projection lens would be required with its inherent disadvantages in addition to requiring a different size mask for each screen distance. The improvement of the converging system over the parallel configuration and its structure has been described. The converging configuration of FIGS. 3 and 4 and as should be utilized with FIG. 5 in the present invention preferably has the apex of the illumination cone disposed in the projection lens entrance pupil as shown in FIG. 3 to thereby permit use of a low speed projection lens. As has been indicated, such a configuration is desirable because an economical projection lens may be employed with fewer optical elements and because of the greater depth of focus of a slow lens. Greater depth of focus enables elimination of operational focus adjustment for different screen distance and one optimum mask can suffice over a wide range of screen distances.

The basic structure of the invention described herein is thus shown in FIGS. 3 and 4 (also modified in FIG. 5) wherein the illuminating flux is caused to converge from the control media as 83 to the projection lens as 85. Such convergence may be effected by imaging the light source in the projection lens entrance pupil 86 as shown in FIG. 3 and the size of this source image may be such as to fill the entrance pupil 86 with light flux.

The principal plane of the projection lens should be located at a distance D from the control media such that:

(1) $$D=\tfrac{1}{2}\left[\left(\frac{Infl}{In-fl}\right)+\left(\frac{Iffl}{If-fl}\right)\right]$$

The speed ($f/$) of the projection lens for the converging case shown in FIG. 3 may be obtained from the following equations:

(2) $$f/ \gtrsim \frac{6fl^2}{e}\left(\frac{If-In}{2InIf-fl(If+In)}\right)$$

(3) $$f/ \lesssim [(e/\lambda)^2 - 0.25]^{1/2}$$

Where in Equations 1, 2 and 3:

$fl$=focal length of projection lens, in feet.
$e$=length in inches of an optical element, several times smaller than the television element to be resolved.
$If$=maxim screen distance in feet.
$In$=minim screen distance in feet.
$\lambda = 2.2 \times 10^{-5}$ inches.

Referring to Equations 1, 2 and 3 hereinabove when the speed ($f/$) of the projection lens is selected by the equations of 2 and 3, the projected image, on the display screen will be in focus over the design range used in Equations 1, 2 and 3 and no adjustment of the projection lens and/or mask will be required.

For example, consider a standard 525 television line picture on a 3 inch raster diagonal, and a 4.5 inch focal length projection lens, a maximum screen distance of 200 feet, and a minimum screen distance of 25 feet. The required projection lens speed in this case would be less than $f/5.6$. With the invention of Dr. Glenn hereinabove identified the speed of the lens should be $f/1.5$. Thus it is seen that a much slower lens can be utilized using the converging means and method of the present invention and necessity for adjustment of the projection lens and/or the mask is eliminated.

Now referring to FIG. 4 of the drawings light from a light source 60 may be applied as represented by light rays 41 through aperture 42 in apertured plate 43 which comprises a first mask system. Disposed at aperture 42 is a converging lens 75. Disposed at a distance S in front of the apertured plate 43 may be a control media 50 which may comprise, for example, a glass plate having a thin film of oil placed thereupon similar to the media of FIGS. 1, 2 and 3. It should be understood, of course, that in place of the oil a tape might be used which would have similar properties and functions to the oil layers in each of FIGS. 3, 4 and 5. The length of distance S depends upon the conditions of display. Disposed axially with and behind the control media 50 may be a projection lens 44 which may have a principal plane 45. The control media 50 and the principal plane 45 of projection lens 44 may be spaced from each other a distance $S_2$. The length $S_2$ may be made equal to the focal length of the projection lens 44. The projection lens 44 is used both as a projection lens and as a Schlieren lens; projection lens 44 thus being a single apparatus serving both functions. Disposed a distance $S_3$ from the principal plane 45 and in front of the projection lens 44 and disposed axially concentrically thereof may be a mask member 46. The length of distance $S_3$ is important. The mask member 46 should be adjustably fixedly mounted with relation to the projection lens 44. This may be done, for example, by adjustably and fixedly mounting mask 46 on projection lens 44 by the rod supports 47. Adjustability for optimum exact distance $S_3$ may be provided, in a number of conventional ways as for example, by threaded screw portions 48 of rod support 47. Light refracted to and diffracted around mask 46 when media 50 is undulated as will be explained hereinafter will impinge upon the screen 49 producing an image thereon. It should be noted that the distance $S_3$ is critical in that the length $S_3$ must be such that substantially no light or image should be projected on the screen 49 in the absence of deforming of the control media 50. As in the apparatus of FIGS. 1 and 2, the system of FIG. 4 should be constructed such that when the control media 50 is not deformed, light passing through the aperture 42 will be entirely blocked by the mask 46 and the screen will not receive such light. Upon scanning of the control media by the electron gun 19a deformation of the control media 50 will occur in accordance with the raster scanned. This in turn will cause diffraction of light rays passing through the projection lens 44 past the outer edges of the mask 46 and such light will reach the screen 49 forming an image (picture) thereon in accordance with the raster scanned on the control media 50. In this manner large screen television display for display of the video information from the electron gun 19a may be effected on the screen 49. The electron beam from electron gun 19a may be velocity modulated to present the picture intelligence represented by such modulation on the screen or the electron guns' video modulation intelligence may be applied to the focusing electrode, for example. This modulating intelligence causes variation of the spot size (variation in cross-sectional dimension of the electron beam).

Summarizing, in operation of the apparatus of FIG. 4 light from light source 60 passes through aperture 42 in apertured plate 43, is converged by converging lens 75, is then projected through the control media 50 and thence through the projection lens 44 to impinge upon the mask 46, and light is blocked from the screen 49 when the control media 50 is not subjected to deformation. Upon scanning of the control media by particles such as electron particles from electron gun 19a the control media 50 is deformed and light rays are thereby deviated around the mask 46 and reach the screen 49 to form an image or picture viewable by observers.

Comparing the inventive apparatus of FIG. 4 with that of FIGS. 1 or 2, in the FIG. 4 apparatus the projection lens 44 performs two functions. In addition to imaging the projected picture upon the display screen, the projection lens 44 also produces an image of the aperture 42 on the mask 46. The mask 46 as can be seen is external to the projection lens 44 and not at its principal plane, which permits of ready adjustment of the mask to make accurate picture presentation feasible. As in the FIG. 3 case the converging of the light rays provided improves flare and contrast conditions and greatly increases the depth of focus so that a very large range of longitudinal disposition of screen 49 is provided.

By way of illustration of this principle, consider a projection lens imaging a raster on a display screen considered at an infinite distance therefrom. The separation between the principal plane of the projection lens and the raster should equal the primary focal length of the projection lens i.e. $S_2 = F.L.$ If the distance S between the aperture and the control media should equal the distance $S_2$ between the control media and the principal plane of the projection lens, an image of aperture 42 may be formed with 1 to 1 magnification on the screen side of the projection lens at a distance ($S_3$) from the principal plane 45 of the projection lens to the mask 46 equal to two times the focal length of the projection lens ($2 \times F.L.$).

It should be understood that any aperture to mask magnification ratio may be employed by the application of well-known lens equations. In this invention the projection lens as employed may eliminate the Schlieren lens and the mask is no longer located within the projection lens.

By way of illustration consider the following:
For a given diffraction angle:

$$A = S \tan \Delta$$

where:

A is the aperture dimension perpendicular to the diffraction grating.
S is the distance between the raster and the aperture.
$\Delta$ is the peak diffraction angle.

When, as shown in FIG. 4 the Schlieren lens is eliminated then $S_3$ will be made equal to or greater than the focal length of the projection lens ($S_3 \geq F.L.$).

Referring to FIG. 5 of the drawings a modification in accordance with the invention may be made where engineering conditions require that the value of S should be less than that given in the above relationship. In such case a weak Schlieren lens 70 may be added and many of the advantages of the invention will still be retained. The power of such a supplementary lens may be determined as follows:

Instruction: Let
$P_1$ equal the power of the projection lens.
$P_2$ equal the power of the supplementary lens.
S equal the distance from the raster to the aperture.
Then:

$$P_2 > \frac{1/S - P_1}{1 - P_1^2}$$

As stated, this modification is shown in FIG. 5 of the drawings. The apparatus is substantially identical to that of FIG. 4 except that a weak Schlieren lens 70 may be added in close, almost abutting, relationship with the control media 50a and axially aligned therewith and with the other elements as in the embodiment of FIG. 4. Operation except for the additional refraction through the weak Schlieren lens is substantially as in the hereinbefore described apparatus of FIG. 4. The rays pass through projection lens 44a to the mask (not shown in FIG. 5) and in the presence of deformation of media 50a are diffracted around the mask to the screen (not shown in FIG. 5).

Summarizing, the improved optical system of the invention controls light flux in accordance with a fast operating (less than $10^{-7}$ seconds) modulating signal which is capable of controliing light flux over a wide range. In the inventive system an illuminated transparent media capable of being deformed is situated so that an image of the media is formed by a projection lens on a display screen or other desired surface. In undisturbed state of the transparent media an image of the light source will be formed on a mask of size and shape similar to the light source illuminating the media the mask being located between the projection lens and a display screen. On deforming the control media as by impinging a modulated electron beam thereon light is refracted and diffracted around the mask and contributes to display screen illumination. The amount of light flux passing around the restricting mask is proportional to the deformation of the control media. The light is caused to converge toward the projection lens as by a converging condensing lens to enable a slower projection lens of lesser diameter entrance pupil to be utilized. Such converging enabling the slower lens of smaller entrance pupil diameter eliminates flare, improves contrast and increases the depth of focus enabling the system to be employed in a relatively large range of screen distances.

While a specific embodiment of the invention has been shown and described, it should be recognized that the invention should not be limited thereto. It is accordingly intended in the appended claims to claim all such variations as fall within the true spirit of the invention.

What is claimed is:

1. A system for projecting a scene image comprising a screen surface, a light source, a first and a second mask system cooperatively disposed so that undiffracted light transmitted from said first mask system may be blocked by said second mask system, a deformable control medium disposed between said first and second mask systems for changing direction of light rays disposed in the light path between said first and second mask systems, a projection lens having an entrance pupil disposed between said medium and said second light mask system said light source being disposed before said first mask system, light converging mean to cause light rays from said first mask system to converge towards said second mask system, said projection lens being disposed with respect to said converging light rays such that the illumination cone of said rays is disposed substantially at the entrance pupil of said projection lens, whereby light rays transmitted by said first mask system are selectively blocked by said second mask system in normal condition of said medium and are diffracted past the second mask system in deformed condition of said medium, and means to scan said medium to cause deformation in relation to an image to be diffracted past said second mask system.

2. A system for projecting an image of a scene on a screen surface comprising a light source, a first and a second mask system cooperatively disposed so that undiffracted light transmitted from said first mask system may be blocked by said second mask system, a control media, a projection lens having an entrance pupil, light converging means to cause light rays transmitted from said first mask system to pass through said medium and said projection lens and converge toward said second mask system, said projection lens being disposed with respect to said converging rays such that the illumination cone of said rays is disposed substantially at the entrance pupil of said projection lens, means to deform said control media, said mask systems being arranged in spatial relationship to one another such that in the presence of deformation of said control media, light rays from said light source will be transmitted by said first mask system and said control media and be refracted to and focused by said projection lens to be diffracted around said second mask system, said screen being in alignment with said second mask system to thereby have formed an image on such screen with deformation of said medium, said second system being disposed to block said converging light rays in the absence of deformation of said control media.

3. Apparatus for providing a television display on a large screen, said apparatus comprising a first mask disposed in front of said screen, a projection lens having an entrance pupil axially aligned with said mask and said screen, a deformable control media, a light source, a second mask disposed between said source and said projection lens, means to limit the dimensions of the light beam from said light source to an amount just sufficient to cover the entire surface of the first mask, the first mask being of size such that deformation of said deformable media within limits of its capability to be deformed will cause light projected therethrough to be diffracted around said first mask, said projection lens being disposed between said control media and said first mask, said second mask, control media, projection lens and first mask being aligned such that light rays from said light source are projected through said second mask and said control media and be focused by said projection lens such that light is blocked by said first mask unless the control media is deformed, means to deform said control media, said control media upon being deformed resulting in the refraction of light rays to said first mask and diffraction of light rays around the edge of said first mask such that light rays are projected to the screen to provide a picture in accordance with the deformation of said control media, and means to converge said light rays towards the entrance pupil of said projection lens.

4. The apparatus of claim 3 wherein said projection lens has a principal plane, said first mask being external to said projection lens principal plane and spaced from said projection lens a distance to cause blocking of light rays when said control media is in normal state, said projection lens thereby imaging the projected picture upon the display screen and producing an image of the aperture of said second mask on said first mask, the principal plane of said projection lens being spaced from said control media a distance equal to:

$$1/2\left[\left(\frac{Infl}{In-fl}\right)+\left(\frac{Iffl}{If-fl}\right)\right]$$

where:

$In$ = minimum screen distance
$If$ = maximum screen distance
$fl$ = focal length of the projection lens.

5. The apparatus of claim 3 wherein said projection lens focal length is at least equal to the distance between said control media and said second mask and including a relatively weak Schlieren lens disposed substantially adjacent to said deformable medium and axially aligned therewith.

6. An electrical system to control light flux in accordance with modulating signals, said system comprising a transparent media having a deformable surface, means to deform said surface in accordance with information desired to be visually displayed and represented by said modulating signals, a screen receptive to projection of said information in accordance with said deformation, a source of relatively intense light, means to limit light projected therethrough disposed between said control media and said source, said light limiting means being disposed with said transparent media to thereby pass a beam of light flux from said source to said surface of said media, a projection lens axially aligned with and disposed between said control media and said screen and having a principal plane normal to said axis, a mask adjustably and fixedly supported in spaced relation to the principal plane of said projection lens, said mask being located a distance from the principal plane of said projection lens such that light is projected on said screen only in the presence of deformation of said control media, and means to effect converging of light rays toward said projection lens to thereby permit a relatively large depth of focus such that the system may be used over a relatively wide range of screen distances.

7. A system for projecting images said system comprising a screen, a mask axially aligned with and disposed in front of said screen, a projection lens having an entrance pupil disposed before said mask and in axial alignment with said mask and said screen, a source of intense illumination, means to converge light rays from said source of intense illumination to an illumination cone disposed within said projection lens, said mask comprising at least one element opaque to light, the area adjacent said element being transparent to light, the said element being disposed to block said light rays from reaching said screen in undisturbed path of said light rays, a light transparent medium disposed between said source and said projection lens, said medium being responsive to energy impinged thereon to refract light rays passing therethrough in accordance with a function of a characteristic of said impinged energy, and means to modulate said transparent medium to cause said refraction of said rays whereby said rays are diffracted around the edges of said element, said medium having properties of storage of its deformation for a predetermined time interval and of being restored substantially fully at the end of said predetermined time interval, said converging rays thereby permitting a relatively slow projection lens of relatively small entrance pupil diameter for a given system, said slow projection lens eliminating flare and giving better contrast and depth of focus.

8. A system for projecting images said system comprising an image displaying element, a first mask system, a second mask system cooperatively disposed with respect to said first mask system so that undiffracted light transmitted from said first mask system may be blocked by said second mask system, a medium capable of being deformed by an electron beam, a projection lens and a source of electromagnetic energy, said source, first mask, deformable medium projection lens, second mask and display element being sequentially disposed in that order in a light path from the source to the display element, means to converge said electromagnetic energy into a beam terminating conically substantially in the region of said projection lens, means for deforming said medium so as to diffract light projected therethrough in accordance with the deformation of said medium, said diffracted light passing beyond said second mask system and impinging upon said image displaying element to form said images, the system thereby providing a relatively large depth of focus for relatively widely variable location of said image displaying element with respect to said second mask and said projection lens.

9. A modulated electromagnetic energy display system for large screen television display, said system comprising means receptive to the modulated energy to display images in accordance with the modulation, a projection lens having an entrance pupil to project electromagnetic energy directed thereto including said images, electromagnetic energy blocking means disposed between said projection lens and said receptive means of configuration characteristics and location to block substantially all of said energy which is exclusive of said images, means to generate said electromagnetic energy, electromagnetic energy modulation means to effect modulation of said generated energy to cause change in direction of said energy in accordance with said images, and means to effect convergence of said energy including said changed direction energy to a point substantially close to the entrance pupil of said projection lens to thereby enable a smaller slower projection lens to be utilized with attendant advantages of eliminating flare, providing better contrast and improving the depth of focus of energy projected from said lens to permit substantially optimum use of said system without modification over a relatively wide range of projection lens to receptive means distances.

10. The apparatus of claim 9 wherein said means to effect convergence comprises a converging condenser lens disposed in the path between said electromagnetic energy generating means and said projection lens.

11. A display system to display images of deviated electromagnetic energy of a predetermined wave energy spectrum comprising a source of intensely concentrated electromagnetic energy, means to concentrate said energy in a path to a converging pattern of at least one characteristic of said energy, means to generate and direct modulation of a characteristic of said energy in accordance with desired image display of said modulation, energy projection means disposed substantially at the point of maximum convergence of said pattern, means responsive to said generated and directed modulation to deviate said one characteristic of said pattern in accordance with said modulation, said responsive means being disposed in the energy path between said source and said projection means, means disposed in a continuation of said path to selectively block said undeviated energy and permit continuation of projection of deviated portions of said pattern, and display means responsive to said passed deviated pattern of energy to present indication of said deviation in energy characteristic.

References Cited in the file of this patent

UNITED STATES PATENTS 2,723,305    Raibourn               Nov. 8, 1955
2,776,399    Arni                   Jan. 1, 1957